United States Patent [19]
Starkey et al.

[11] Patent Number: 5,814,233
[45] Date of Patent: Sep. 29, 1998

[54] COMPOSITIONS AND METHODS FOR TREATING WATER

[75] Inventors: Ron Starkey, Lawrenceville; Kysler DeGuzman, Tucker; Geoffrey A. Brown, Lithonia; P. Kirk Mitchell, Marietta, all of Ga.

[73] Assignee: Great Lakes Chemical Corporation, West Lafayette, Id.

[21] Appl. No.: 966,673

[22] Filed: Nov. 10, 1997

[51] Int. Cl.$^6$ .................................................. C02F 1/72
[52] U.S. Cl. .................... 210/759; 210/903; 210/916; 210/749; 252/175; 252/180; 252/181; 514/389; 514/714
[58] Field of Search .................... 210/759, 903, 210/916, 749; 252/175, 180, 181; 514/714, 471, 473, 396, 400, 389

[56] References Cited

U.S. PATENT DOCUMENTS

| | | | |
|---|---|---|---|
| 3,147,219 | 9/1964 | Paterson | 210/62 |
| 3,412,021 | 11/1968 | Paterson | 210/62 |
| 4,164,574 | 8/1979 | Quinlan | 424/199 |
| 5,620,595 | 4/1997 | Austin et al. | 210/169 |

FOREIGN PATENT DOCUMENTS

WO95/14021  5/1995  WIPO.

OTHER PUBLICATIONS

Pavlovich, G.Z. and Luthy, R.G., "Complexation of Metals with Hydantoins", *Water Res.*, vol. 22, No. 3, pp. 327–336, 1988.

*Primary Examiner*—Neil McCarthy
*Attorney, Agent, or Firm*—Woodard, Emhardt, Naughton, Moriarty & McNett

[57] ABSTRACT

A method of remediating methyl amine and/or methyl amine derivative odors in aqueous systems by contacting the methyl amine or methyl amine derivative with a compound having amide or imide functionality, such as a hydantoin composition, in the presence of hydrogen peroxide. The amide/imide composition is preferably a non-halogenated, singe-ring hydantoin that binds methyl amines to the amide or imide functional group of the hydantoin.

37 Claims, 2 Drawing Sheets

COMPOSITIONS AND METHODS FOR TREATING WATER

FIELD OF THE INVENTION

The present invention relates generally to methods of treating water, and more particularly to methods of treating recreational or industrial water with peroxygen oxidizers while simultaneously remediating undesirable methyl amine odors.

BACKGROUND OF THE INVENTION

It is well known to the art that the cleanliness and clarity of recreational waters is critical to their desirability, and that water can become cloudy as bacteria (dead or alive) and swimmer wastes accumulate, overwhelming the system's filtering capacity. For this reason, sanitizers and clarifiers are commonly used in recreational waters to achieve acceptable levels of clarity and cleanliness. Similarly, other water systems such as evaporative cooling waters, pulp and paper process water, and water used in leather curing, cosmetics, paints, plastics, etc. are routinely treated with sanitizers and/or clarifiers to maintain desirable water quality.

It is also known to the art that oxidizers such as chlorine, bromine, hydrogen peroxide and potassium monopersulfate may be used to achieve and maintain clear water. However, there are drawbacks to using many of these oxidizers. For example, chlorine and bromine must be maintained at levels of 3 to 5 ppm (as elemental halogen) and periodic superhalogenation may be required to assure microbiological control and water quality. Hydrogen peroxide and potassium monopersulfate must be used in much higher concentrations because they are weaker oxidizers than the halogens. Additionally, hydrogen peroxide and potassium monopersulfate are sensitive to transition metals which rapidly degrade their activity.

One other problem heretofore associated with the use of hydrogen peroxide (alone or combined with polyquats and/or monomeric quats) is the fact that it tends to facilitate the generation of methyl amine and methyl amine derivative odors in the water. In particular, a repugnant fishy odor (tri and di methylamine) is generally produced over time. This obviously makes the use of peroxide less desirable for treating recreational water systems.

In addition to the above, it is known to the art that methyl amine odors are produced in a number of industrial applications other than recreational water systems. For example, newly made pressboard contains trimethylamine releasing binders, that release methyl amine odors from products in which they are used.

As to methods of remediating methyl amine odors, in recreational water systems it is known to add halogens such as chlorine or bromine to the water. However, this invariably results in a loss of hydrogen peroxide since it is rapidly destroyed by the chlorine or bromine. Further, the necessary dosages of chlorine and or bromine to destroy the tri, di and mono methyl amines exceeds normal shock chlorination amounts and makes halogen destruction of methyl amine derivatives financially unfeasible for end users. Field research has demonstrated that superchlorination with calcium, sodium or lithium hypochlorite to levels in excess of 300 to 400 ppm (as chlorine) is necessary to overcome the fishy odor of previously cited amine derivations. Compared to typical superchlorination levels of 10 to 12 ppm, the amount is 30 to 40 orders of magnitude over commonly suggested amounts.

As to treatment methods for non-recreational water systems, current methods for suppressing amine odors in other systems include coating the surface of the pressboards (e.g., automobile door trim panels) with a layer of acid in an aqueous ethanol solution. This method does not covalently bind the amine but converts it to a salt form. In addition, suppressing the odor or taste of docosahexaenoic acid (oil from fish used in cosmetic, food and other manufacturing) frequently is accomplished by the addition of masking perfumes or flavors. For example, odor absorbing agents (organic acids, plant extracts, and cyclic polysaccharides) are commonly added to laundering material to suppress amine odors. Finally, effluents from ammonia plants which contain methylamines may be destroyed by oxidation with ozone.

As further background, not only do methyl amines have the pungent, offensive odor described above, methyl amines have also been identified in oxidizing reactions to become nitrosamines (and hydroxylamines which oxidize further to form nitrosamines), as shown in Scheme 1 below. Nitrosamines are known carcinogens regulated and tested for by the EPA.

Scheme 1
Oxidation of di and mono
methylamines to nitrosamine and hydroxylamines.

Monomethylamine

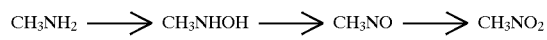

Dimethylamine

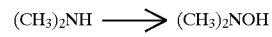

In view of the above it can be seen that a need exists for an improved method of remediating methyl amine odors, particularly in recreational water systems. In addition, a need exists for a method of treating recreational waters that will not only remediate offensive methyl amine odors but will also remediate the production of potentially harmful nitrosamines. The present invention addresses those needs.

SUMMARY OF THE INVENTION

In one aspect of the present invention there is provided a method of eliminating methyl amine derivative odors from recreational water systems that have been sanitized with hydrogen peroxide. In that aspect of the invention, methyl amine derivative compositions are contacted with a methyl amine-binding amide/imide composition in the presence of hydrogen peroxide. The methyl amine derivative compositions are compositions that have at least one methyl amine group, while the methyl amine-binding amide/imide composition is a composition having at least one amide or imide functional group which can be used to bind a methyl amine derivative to that functional group. In the most preferred embodiments, the methyl amine-binding amide/imide composition is a dimethyl hydantoin.

In another aspect of the invention the binding of methyl amines and/or methyl amine derivatives serves to remediate the production of hazardous nitrosamines by preventing the methyl amine compound from being oxidized to the nitrosamine.

In still another aspect of the invention, amide/imide compositions are used to extend the useful life of hydrogen peroxide in water by complexing with transition metals and thereby preventing the transition metal from complexing with the hydrogen peroxide.

Further aspects and advantages of the present invention will be apparent from the following description.

DESCRIPTION OF THE PREFERRED EMBODIMENTS

Figure 1:
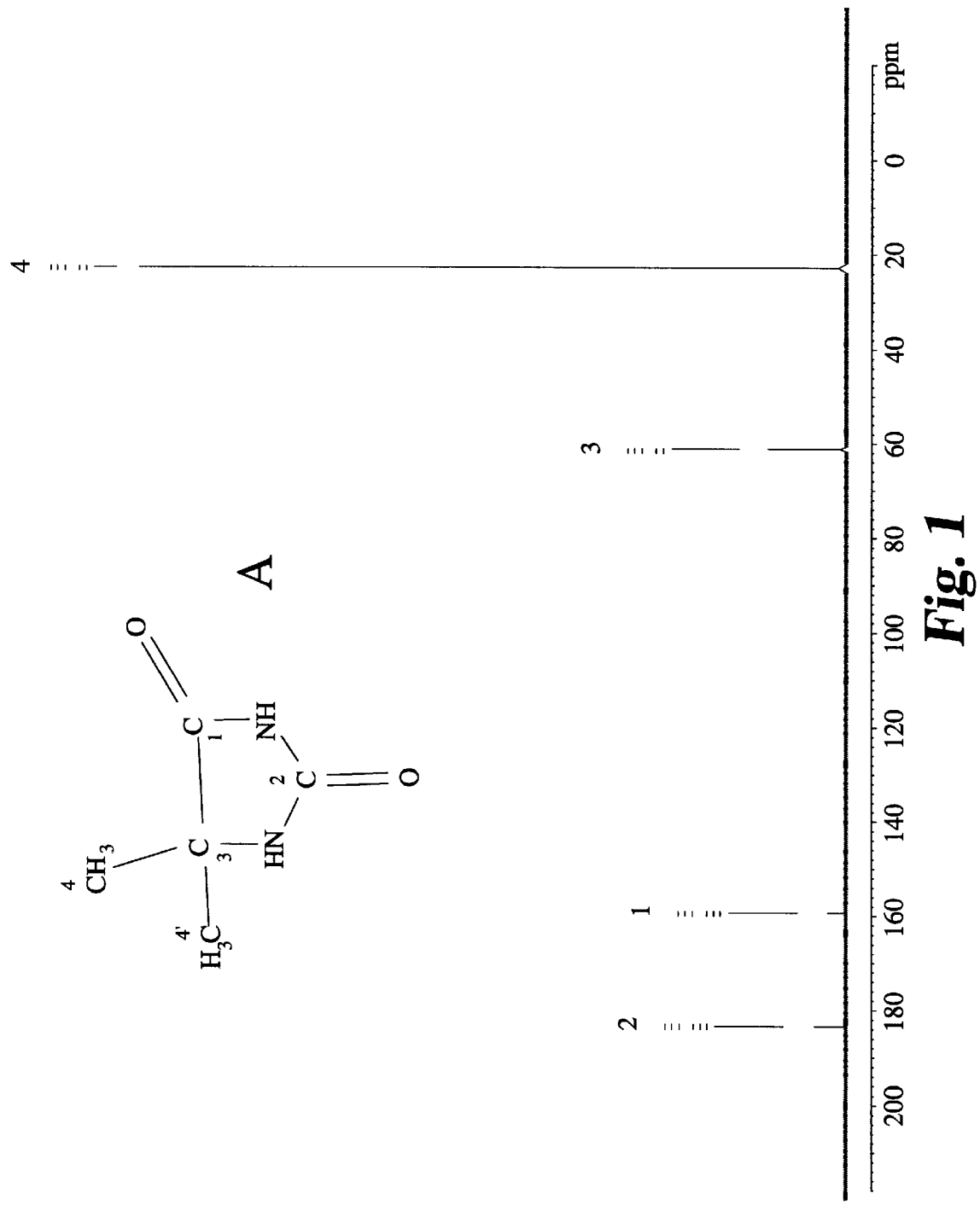
FIG. 1 shows a $^{13}$C spectrum of a "DMH only" solution to serve as a control for determining the binding sites of trimethylamine with DMH.

For the purpose of promoting an understanding of the principles of the invention, reference will now be made to preferred embodiments and specific language will be used to describe the same. It will nevertheless be understood that no limitation of the scope of the invention is thereby intended, such alterations and further modifications in the illustrated invention, and such further applications of the principles of the invention as illustrated therein being contemplated as would normally occur to one skilled in the art to which the invention relates.

As suggested above, one aspect of the present invention involves a method of remediating methyl amine odors in aqueous systems. As used herein "remediating" methyl amine or methyl amine derivative odors means preventing such odors from being released into the surrounding environment where they might be observed by users of the water. Thus, "remediating" includes preventing the odorous compounds from being formed, destroying the odorous compounds after they have been formed, binding the odorous compounds to prevent them from being released, or otherwise preventing the odorous compounds from being released.

As further definition, the most preferred embodiments relate to the remediation of methyl amine odors from recreational water systems such as a swimming pools, spas and hot tubs. Non-recreational water systems such as cooling towers, industrial process waters, etc., may also be remediated.

As summarized above, the preferred embodiment of the present invention generally comprises contacting a methyl amine or methyl amine derivative with a composition having amide or imide functionality in the presence of a peroxygen compound such as hydrogen peroxide. Because hydrogen peroxide is also used to treat swimming pool waters as described above, the method is particularly useful and appropriate for use in swimming pools or other recreational waters.

In one preferred embodiment of the present invention the amide/imide composition is a methyl amine-binding amide/imide composition, and most preferably is a non-halogenated, single-ring hydantoin. In this embodiment it is believed that the amide/imide composition binds the methyl amine to produce a bound composition of the formula:

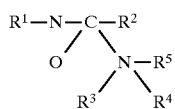

where $R^1$ and $R^2$ are the substituents of the methyl amine-binding amide/imide composition which are adjacent to the amide or imide functional group; and $R^3$, $R^4$, and $R^5$ are the substituents of the methyl amine which are adjacent to the central N. As used herein then, a methyl amine-binding amide/imide composition is a composition having at least one amide or imide functional group which can be used to bind a methyl amine derivative to that amide or imide functional group to produce such bound compounds. It is further understood that amide/imide compositions are compositions having amide and/or imide functionality. Preferably, the amide/imide compositions are single-ring hydantoins, most preferably dimethyl hydantoin.

In other preferred embodiments the amide/imide composition does not bind the methyl amine, but otherwise prevents methyl amine odors from being released. While the precise mechanism of action is not understood, it is understood that adding such amide/imide compositions to water in the presence of peroxygen compounds remediates methyl amine and methyl amine derivative odors.

In certain preferred embodiments the amide/imide composition does not deliver active halogen to the aqueous system. This includes all amide/imide compositions that are non-halogenated, and also includes compositions that are halogenated but are unable to deliver active halogen to aqueous systems. Non-halogenated dimethylhydantoin is the most preferred of these compositions.

It is to be appreciated that the present invention is not limited to hydantoins to provide the amide and/or imide functionality. For example, succinimide, cyanuric acid, glycoluril, and other amide and/or imide functional compositions (as well as their derivatives) may also be used.

EXAMPLE 1

Figure 2:
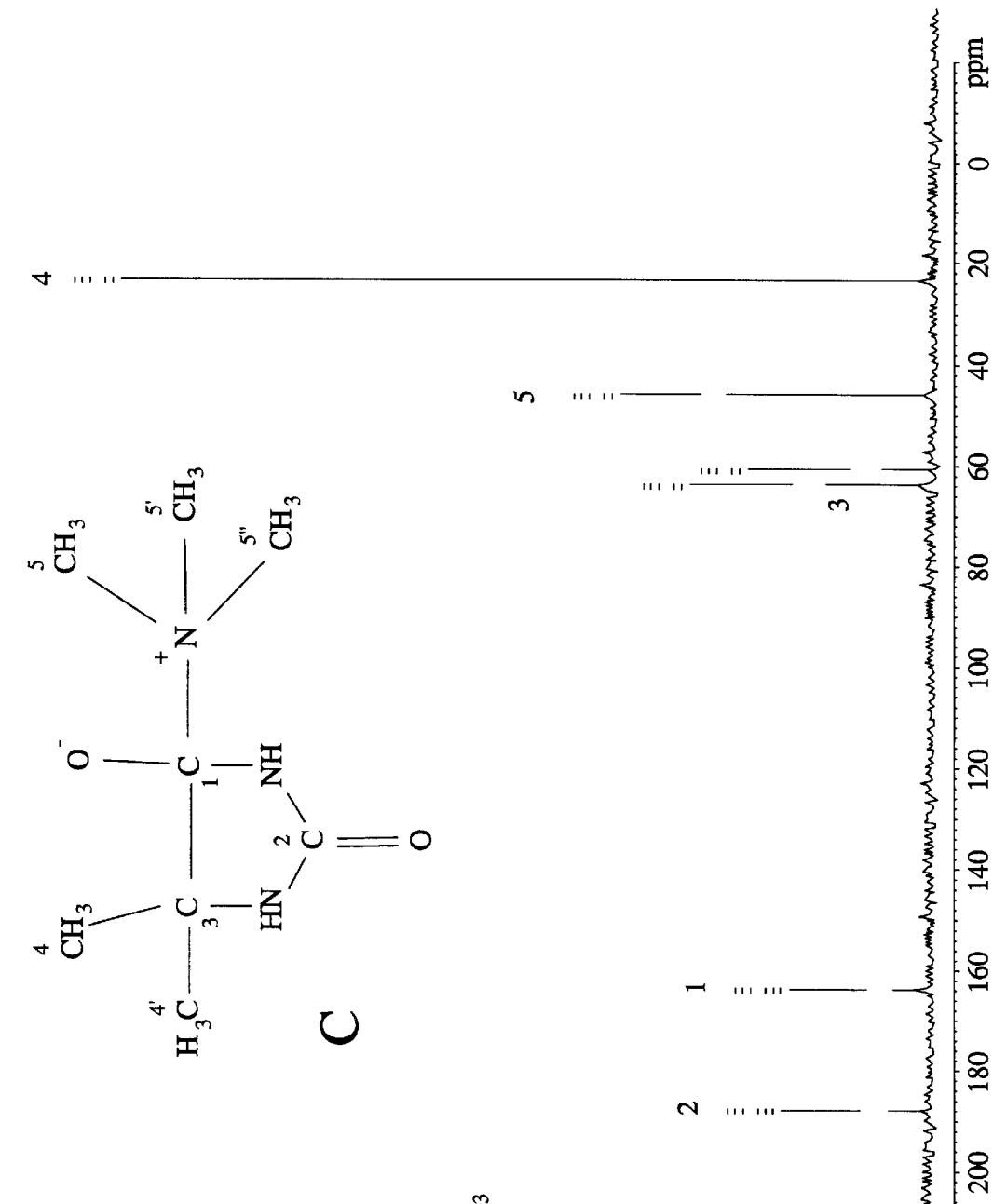
FIG. 2 shows a$^{13}$ C spectrum of a "DMH plus TMA plus $H_2O_2$" solution for determining the binding sites of trimethylamine with DMH.

Determination of the binding sites of trimethylamine with DMH was investigated. The experiment was carried out using $^{13}$C Nuclear Magnetic Resonance (NMR) with 400 mHz Varian Magnet. The deuterated solvent used for this experiment was 99.98% $D_2O$. Two solutions were prepared and analyzed. The first solution containing 10% DMH was used as a control (Sample A) while 10% DMH, 5% trimethylamine and 0.1% hydrogen peroxide made up the second solution. Four significant peaks were detected in the control solution (DMH only) as shown in FIG. 1. The peak at 24.374 ppm was identified as the two identical carbons of the methyl groups (#4) of the hydantoin. The sp$^3$ hybridized carbon (#3) gave rise to the peak at 61.537 ppm. The peaks at 183.138 ppm and 158.735 ppm were identified as the carbonyl carbons #1 and #2, respectively. The $^{13}$C spectrum of the solution containing DMH, TMA and $H_2O_2$ shows six well resolved and distinguishable peaks (FIG. 2). Peaks at 24.4345 ppm and 61.909 ppm correspond to the methyl groups (#4) and sp$^3$ carbon (#3) of the DMH molecule. The peak at 45.690 ppm was identified as the three identical carbons of the trimethylamine molecule (#5). Carbonyl carbons #1 and #2 were observed at 163.355 ppm and 187.811 ppm, respectively. A significant downfield chemical shift was observed in the carbonyl groups of DMH upon addition of TMA. This phenomenon can be attributed to the binding of another electron withdrawing group (i.e., nitrogen) to the carbonyl carbons of DMH. The peak at 45.690 ppm can be attributed to impurities incorporated in the DMH or TMA formulations.

In summary, Example 1 demonstrates that the carbonyl carbons of DMH are the sites of addition by TMA.

EXAMPLE 2

In a 500 ml flask, 50 ppm of trimethylamine (TMA) was added along with 500 ppm of hydrogen peroxide (a 1 to 10 ratio was used for TMA to peroxide, in actual systems the ratio of peroxide would be higher). A 100 ml portion was poured off to serve as the control. To the remaining 400 ml solution, enough DMH was added to provide 500 ppm of DMH. The samples were allowed to set overnight and sent for gas chromatography analysis the following morning. The results were as follows:

TABLE 1

Binding properties of DMH in the presence of hydrogen peroxide.

| Solution | TMA Level |
|---|---|
| TMA and Peroxide | 49 ppm |
| TMA, Peroxide, and DMH | 20 ppm |

From these results it is evident that amine/imide compositions such as dimethylhydantoin bind TMA in the presence of hydrogen peroxide. By this method the production of methyl amine odors is remediated.

EXAMPLE 3

In a 1 liter flask, a 1250 ppm trimethylamine solution was prepared. Three, 250 ml portions were allocated from the trimethylamine solution for this experiment. The first solution was a trimethylamine control, while 3000 ppm 5,5-dimethylhydantoin was added to the second solution. The third solution contained 3000 ppm DMH and 3000 pm solution One. (The composition of solution One is 30% hydrogen peroxide, 1.5% Ply[oxyethylene (dimethylimino) ethylene-(dimethylimino) ethylene dichloride] and 0.5% Poly-(hexamethylammonium) chloride). Part-per-million solutions were set using 30% overall activity for solution One. The analysis of the third solution showed that addition of 5,5'-dimethylhydantoin and solution One significantly decreased the trimethylamine concentration from 1224 ppm to 96 ppm. In contrast, the concentration of trimethylamine in the second solution did not change with addition of DMH. This shows the importance of the peroxygen compound in binding methyl amine derivatives with amide/imide compositions such as DMH. Without the presence of a peroxygen no binding of amine derivatives is observed.

TABLE 2

Binding properties of DMH in the presence of hydrogen peroxide (TMA was quantified by gas chromatography).

| Solution | Initial TMA Level | Final TMA Level |
|---|---|---|
| TMA Control | 1224 ppm | 1224 ppm |
| TMA and 3,000 ppm DMH | 1224 ppm | 1224 ppm |
| TMA, 3,000 ppm DMH and Solution One | 1224 ppm | 96 ppm |

EXAMPLE 4

This experiment was conducted to verify the performance of DMH in a large scale system. Two spas, which were used for the experiment, were subjected to the solution One program (program is 30 ppm peroxide and 2 ppm polyquats). A bacterial innoculum (*E. Coli, S. Aureus,* and *P. aueriaonosa*) was prepared and added in proportion to each spa's size. The bacterial innoculum provides a nitrogenous source, and when reacted with hydrogen peroxide produces methyl amine derivatives.

A significant amount of trimethylamine was detected in spa 1. Spa 1 had accumulated 10 ppm of trimethylamine after 9 days of testing. In spa 2 (which was run under the same procedure as spa 1 except 4 ppm of DMH was added at the start) no measurable amounts of trimethylamine was ever observed. The level of trimethylamine was below the MDL (minimum detection limit) of the gas chromatography instrument (i.e., below 5 ppm for TMA analysis). This suggests that amide/imide compositions such as DMH can prevent the accumulation of volatile trimethylamine even at very low concentrations.

EXAMPLE 5

Continuing from Example 4, enough DMH was added to Spa 1 to give an 8 ppm final concentration (peroxide level was >1 ppm and <10 ppm). DMH was added to Spa 1 to test the ability of DMH to bind trimethylamine. Two days later the concentration of trimethylamine in Spa 1, which started at 10 ppm, was below the MDL. There was no trimethylamine odor observed in Spa 1.

EXAMPLE 6

An experiment exploring the scope efficacy and compatibility of DMH with low dosage halogen programs, such as solution Two, as performed. The components of solution Two are: the solution One components, a slow dissolving trichloro stick, and ethylenediaminetetracetic acid (EDTA). A pool was used for this experiment. Formation of trimethylamine as low as 1 ppm was determined quantitatively through gas chromatography, and qualitatively based on odor after several weeks of treatment with solution Two. (The use of qualitatively smelling the presence of trimethylamine is based on the fact that a person is able to smell trimethylamine before it can be quantitatively measured. Gas chromatography can measure levels in part-per-million of trimethylamine, but a person can smell trimethylamine in parts-per-billion.) Twelve parts per million of DMH was added to remediate the methyl amine derivative odors. The following day, the pool had no offensive trimethylamine odor. Quantitative analysis showed no detectable concentration of trimethylamine. These results suggest that DMH can also be incorporated to the formulations of low dosage halogen programs.

EXAMPLE 7

This experiment was set up to determine if DMH, in the presence of hydrogen peroxide ($H_2O_2$), could bind monomethylamine (MMA), dimethylamine (DMA) along with trimethylamine (TMA). Binding the derivatives is important for the prevention of potential nitrosamine formation. Three 500 ml flasks were set up. In each flask one of the methylamine derivatives was added. To each flask 500 ppm of hydrogen peroxide was added. A 100 ml portion was then poured off from each flask to serve as controls. To each of the remaining 400 ml solutions, 500 ppm of DMH was added. The flasks were allowed to set overnight and were analyzed for methylamine derivatives the next day. Results are as follows:

TABLE 3

Effects of DMH on methylamine derivatives in the presence of hydrogen peroxide.

| Flask No. | Solution (control) | Initial Level | Solution (sample) | Final Level |
|---|---|---|---|---|
| 1 | TMA & $H_2O_2$ | 49 ppm | TMA, DMH and $H_2O_2$ | 20 ppm |
| 2 | DMA & $H_2O_2$ | 89 ppm | DMA, DMH and | 31 ppm |

TABLE 3-continued

Effects of DMH on methylamine derivatives in the presence of hydrogen peroxide.

| Flask No. | Solution (control) | Initial Level | Solution (sample) | Final Level |
|---|---|---|---|---|
| 3 | MMA & $H_2O_2$ | 97 ppm | MMA, DMH and $H_2O_2$ | 56 ppm |

From the above results it is apparent that DMH is able to bind methylamine derivatives and thus to remediate methyl amine odors in aqueous systems.

In order to test whether the amide/imide compositions used in the present invention increase the activity of peroxide in water, time kill experiments, MIC experiments, and ORP readings were performed. The test showed that the amide/imide compositions used in the present invention are not contributing to increased activity of hydrogen peroxide.

EXAMPLE 8

Time Kill Experiment

The time to kill bacteria with the compositions of the present invention was tested as follows. Solution One (the composition of solution One is 30% hydrogen peroxide, 1.5% Poly[oxyethylene (dimethylimino) ethylene-(dimethylimino) ethylene dichloride] and 0.5% Poly[(hexamethyl-ammonium) chloride] was run alone and in combination with DMH. Peracetic acid was set up as a control for observed activation. *S. faecalis* and *E. coli* were added to the solutions separately. Samples were taken at various times and deactivated. Recovery of viable bacteria indicates kill time has not been reached. Results are listed in Table 1.

TABLE 4

Kill time results, in minutes, comparing peroxygens with and without DMH.

| Solution | *E. coli* | *S. faecalis* |
|---|---|---|
| 20 ppm Peracetic Acid | 3 minutes | 4 minutes |
| 30 ppm Solution One | >150 | >150 |
| 30 ppm Solution One and 8 ppm DMH | >150 | >150 |

EXAMPLE 9

Minimum Inhibitory Concentration Experiment

In order to test minimum inhibitory concentrations (MIC), solution One was run alone and with DMH. Hydrogen peroxide was also run alone and with DMH. Results are listed in Table 2.

TABLE 5

MIC results comparing peroxygens with and without DMH.

| Solution | MIC (*E. coli*) | MIC (*S. faecalis*) |
|---|---|---|
| Solution One | 25 ppm $H_2O_2$ | 25 ppm $H_2O_2$ |
| Solution One and DMH | 25 ppm $H_2O_2$ and 3.3 ppm DMH | 25 ppm $H_2O_2$ and 3.3 ppm DMH |

TABLE 5-continued

MIC results comparing peroxygens with and without DMH.

| Solution | MIC (*E. coli*) | MIC (*S. faecalis*) |
|---|---|---|
| Hydrogen Peroxide | 25 ppm $H_2O_2$ | 25 ppm $H_2O_2$ |
| Hydrogen Peroxide and DMH | 25 ppm $H_2O_2$ and 3.3 ppm DMH | 25 ppm $H_2O_2$ and 3.3 ppm DMH |

EXAMPLE 10

ORP Readings

ORP readings of hydrogen peroxide were taken with various concentrations of DMH and TAED to investigate any activation of the peroxide. All solutions were set at pH 7.0 for testing. Results are listed in Table 3.

TABLE 6

ORP results comparing DMH and TAED activation of hydrogen peroxide.

| Solution | Initial ORP Level | Final ORP Level |
|---|---|---|
| 1000 ppm $H_2O_2$ and 5000 ppm DMH | 267 mV | 267 mV |
| 1000 ppm $H_2O_2$ and 5000 ppm TAED | 278 mV | 300 ± mV |

From the above results it is apparent that DMH is not contributing to increased activity of hydrogen peroxide.

In another aspect of the present invention, amide/imide compositions are used to improve peroxide stability and useful life by complexing with transition metals. As noted above, hydrogen peroxide, potassium monopersulfate and other peroxygens are used to oxidize organic material in the system, but if transition metals are present, they will catalytically breakdown the non-halogen oxidizer causing microbiological growth and fouling of the system. DMH imparts a demonstrable effect in stabilizing the non-halogen oxidizers and maintaining the chemical equilibrium in the system. Stabilizers like ethylenediaminetetracetic acid (EDTA) are known to help stabilize hydrogen peroxide by complexing with transition metals, but EDTA is limited in use with high concentrations of hydrogen peroxide due to its lack of stability in high oxidizer solutions. DMH, on the other hand, can be formulated into neat concentrations (35%) of hydrogen peroxide without causing breakdown of either compound.

In a further aspect of the invention, both a first chelating composition (preferably a non-halogenated, single-ring hydantoin) and a second chelating composition (preferably EDTA) are added to the water. In this embodiment, the first chelating composition is an amide/imide composition as described above which is able to bind or otherwise remediate methyl amines or methyl amine derivatives, and thus to prevent methyl amine odors from being released from the water. The second chelating composition acts to bind metals in the water, thereby keeping the first chelating composition free to act on the methyl amines. In the most preferred embodiments the second chelating composition differs in composition from the first chelating composition.

EXAMPLE 11

A Continuous Scanning UV-Vis Spectrophotometric method was used to determine the intercalating properties of DMH. The underlying principles involved are comparing the $\lambda_{max}$ of unbound metal ion and bound complex (metal bound to DMH) in solution. A significant change in the $\lambda_{max}$ between the unbound metal and the bound metal/DMH complex signifies a form of intercalation reaction.

The result of the experiment shows that the solution containing $Cu^{2+}$ ion has a $\lambda_{max}$ at 680 nm. This wavelength shift indicates that DMH can intercalate with copper metal ion, thus preventing it from precipitating out of solution at alkaline pH.

EXAMPLE 12

A 40,000 gallon swimming pool treated with hydrogen peroxide is provided. Transition metals are present and must be chelated to maintain the system. Enough EDTA is added to achieve a final concentration of 5 ppm to chelate the metals. The initial cost to achieve 5 ppm levels is $0.67 on a raw material basis. This will provide the system with the protection it needs to stabilize the peroxide. This protection is short lived though since EDTA has a half-life of 4.3 days. Frequent additions are therefore necessary to provide the system with the protection that is needed. To run the system, 2 additions per month is needed to provide the system with the chelator. This comes to a yearly cost $70.00 to provide levels of chelator in the system, not including the cost of the peroxide that is degraded when the EDTA breaks down and releases the transition metal which immediately starts to degrade the peroxide. This cost also does not include any labor that may be necessary to make the frequent additions.

EXAMPLE 13

A system is identical to the one mentioned above is provided. Enough DMH is added to the system to achieve a final concentration of 5 ppm to chelate the transition metals present. The initial cost to achieve 5 ppm is $0.72 on a raw material basis. This will provide the system with the protection it needs for a year since DMH is highly stable and does not break down easily.

If methyl amine derivatives are formed in the system though, the DMH will then be unable to remediate these derivatives since it is bound with the metal. Accordingly, EDTA is added to remove the transition metal from DMH, freeing it to remediate the amine derivatives.

By using DMH, cost is reduced. Less raw material, fewer additions and better stabilization of peroxide is achieved using DMH. The cost to remediate methyl amine odors and chelate transition metals is minimized.

It is to be appreciated that all processes of removing the metals from the system using EDTA are still be viable in the presence of DMH. DMH does not interfere with EDTA's chelation ability and provides the system with an alternate chelation method when the EDTA is degraded.

It is also to be appreciated that chelating agents other than EDTA may be used as the second chelating agent. The primary consideration is that the second chelating agent be able to chelate transition metals bound to the amide/imide composition so that the amide/imide composition is free to remediate methyl amine derivatives.

While the invention has been illustrated and described in detail in the foregoing description, the same is to be considered as illustrative and not restrictive in character, it being understood that only the preferred embodiments have been shown and described, and that all changes and modifications that come within the spirit of the invention are desired to be protected.

What is claimed is:

1. A method of remediating methyl amine and methyl amine derivative odors in aqueous systems, the method comprising binding the methyl amine or methyl amine derivative to a methyl amine-binding amide/imide composition, wherein:

(a) said methyl amine-binding amide/imide composition is a composition that does not deliver active halogen to the aqueous system, but which has at least one amide or imide functional group effective to bind a methyl amine or methyl amine derivative to produce a compound of the formula:

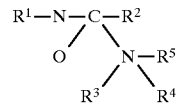

with:

$R^1$ and $R^2$ being the substituents of the methyl amine-binding amide/imide composition which are adjacent to the amide or imide functional group; and $R^3$, $R^4$, and R being the substituents of the methyl amine or methyl amine derivative which are adjacent to the central N of the methyl amine or the methyl amine derivative; and (b) said binding is effected by contacting the methyl amine or methyl amine derivative with said methyl amine-binding amide/imide composition in the presence of a peroxygen compound.

2. The method of claim 1 wherein said peroxygen compound is hydrogen peroxide.

3. The method of claim 1 wherein said methyl amine-binding amide/imide composition is a hydantoin.

4. The method of claim 3 wherein said hydantoin is a methylated hydantoin.

5. The method of claim 4 wherein said dimethyl hydantoin is 5–5'-dimethyl hydantoin.

6. The method of claim 1 wherein said peroxygen compound is hydrogen peroxide, and wherein said methyl amine-binding amide/imide composition is a hydantoin.

7. The method of claim 6 wherein said hydantoin is 5–5'-dimethyl hydantoin.

8. The method of claim 1 wherein said binding step comprises binding methyl amine or methyl amine derivative in swimming pool water, wherein said swimming pool water comprises at least about 1 ppm hydrogen peroxide.

9. The method of claim 1 wherein said binding step is effected by contacting the methyl amine derivative with a solution of at least about 0.01% of a methyl amine-binding amide/imide composition and at least about 1% of a peroxygen compound.

10. The method of claim 9 wherein said binding step is effected by contacting the methyl amine derivative with a solution of at least about 0.01% dimethylhydantoin and at least about 1% hydrogen peroxide.

11. A method of remediating odors from methyl amines or methyl amine derivatives in aqueous systems by contacting the methyl amines or methyl amine derivatives with a non-halogenated, single ring hydantoin composition in the presence of a peroxygen compound.

12. The method of claim 11 wherein said peroxygen compound is hydrogen peroxide.

13. The method of claim 11 wherein said hydantoin is a methylated hydantoin.

14. The method of claim 13 wherein said dimethyl hydantoin is 5–5'-dimethyl hydantoin.

15. The method of claim 11 wherein said contacting step comprises contacting methyl amines or methyl amine derivatives with said non-halogenated, single ring hydantoin composition in swimming pool water, wherein said swimming pool water comprises at least about 1 ppm hydrogen peroxide.

16. The method of claim 11 wherein said contacting step is effected by contacting the methyl amines or methyl amine derivatives with at least about 0.01% of said non-halogenated, single ring hydantoin composition and at least about 1% of said peroxygen compound.

17. The method of claim 16 wherein said contacting step is effected by contacting the methyl amines or methyl amine derivatives with a solution of at least about 0.01% dimethylhydantoin and at least about 1% hydrogen peroxide.

18. A composition of matter, comprising a blend of:
(a) a peroxygen compound, and
(b) a methyl amine-binding amide/imide composition; wherein said methyl amine-binding amide/imide composition is a composition that does not deliver active halogen when provided to an aqueous system, and which has at least one amide or imide functional group effective to bind a methyl amine or methyl amine derivative when said methyl amine-binding amide/imide composition contacts a methyl amine or methyl amine derivative in the presence of an aqueous peroxygen compound.

19. The composition of claim 18 wherein said peroxygen compound is hydrogen peroxide.

20. The composition of claim 18 wherein said methyl amine-binding amide/imide composition is a hydantoin.

21. The composition of claim 20 wherein said hydantoin is a methylated hydantoin.

22. The composition of claim 21 wherein said dimethyl hydantoin is 5–5'-dimethyl hydantoin.

23. The composition of claim 18 wherein said peroxygen compound is hydrogen peroxide, and wherein said methyl amine-binding amide/imide composition is a hydantoin.

24. The composition of claim 23 wherein said hydantoin is 5–5'-dimethyl hydantoin.

25. The composition of claim 12 wherein said blend comprises at least about 1 ppm hydrogen peroxide.

26. The composition of claim 20 wherein said blend comprises at least about 1 ppm hydantoin.

27. A composition of matter, comprising a blend of:
(a) a peroxygen compound, and
(b) a non-halogenated, single ring hydantoin composition said composition, when added to aqueous systems, being effective to remediate methyl amine and methyl amine derivative odors in said aqueous systems.

28. The composition of claim 27 wherein said peroxygen compound is hydrogen peroxide.

29. The composition of claim 27 wherein said non-halogenated, single ring hydantoin is a methylated hydantoin.

30. The composition of claim 29 wherein said methylated hydantoin is 5–5'-dimethyl hydantoin.

31. The composition of claim 27 wherein said peroxygen compound is hydrogen peroxide, and wherein said non-halogenated, single ring hydantoin is 5–5'-dimethyl hydantoin.

32. The composition of claim 27 wherein said blend comprises at least about 1 ppm hydrogen peroxide.

33. The composition of claim 27 wherein said blend comprises at least about 1 ppm hydantoin.

34. A method of preventing methyl amine odors from forming in hydrogen proxide-treated water systems, the method comprising adding to a hydrogen peroxide-treated water system at least 1 ppm of a non-halogenated, single-ring hydantoin.

35. The method of claim 34 wherein said non-halogenated, single-ring hydantoin is dimethyl hydantoin.

36. A method of stabilizing hydrogen peroxide and remediating methyl amine and methyl amine derivative odors in water systems, the method comprising:
(a) providing to a hydrogen peroxide-treated water system a first chelating composition comprising at least 1 ppm of a non-halogenated, single-ring hydantoin; and
(b) providing to said hydrogen peroxide-treated water system a second chelating composition differing in composition from said first chelating composition and being effective to remove transition metals from said first chelating composition said single-ring hydantoin being effective to remediate methyl amine and methyl amine derivative odors in said water systems.

37. A method of stabilizing hydrogen peroxide and remediating methyl amine and methyl amine derivative odors in water systems, the method comprising:
(a) providing to a hydrogen peroxide-treated water system a first chelating composition comprising a methyl amine-binding amide/imide composition that does not deliver active halogen to the aqueous system but which has at least one amide or imide functional group effective to bind a methyl amine or methyl amine derivative to produce a compound of the formula:

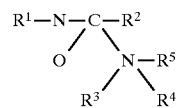

with:
$R^1$ and $R^2$ being the substituents of the methyl amine-binding amide/imide composition which are adjacent to the amide or imide functional group; and
$R^3$, $R^4$, and $R^5$ being the substituents of the methyl amine or methyl amine derivative which are adjacent to the central N of the methyl amine or the methyl amine derivative; and
(b) providing to said hydrogen peroxide-treated water system a second chelating composition differing in composition from said first chelating composition and being effective to remove transition metals from said first chelating composition.

* * * * *

UNITED STATES PATENT AND TRADEMARK OFFICE
CERTIFICATE OF CORRECTION

PATENT NO. : 5,814,233
DATED : September 29, 1998
INVENTOR(S) : Ron Starkey et al.

It is certified that error appears in the above-identified patent and that said Letters Patent is hereby corrected as shown below:

ON THE TITLE PAGE,

At section [73] "West Lafayette, Id." should read --West Lafayette, IN--.

At column 5, line 60, "aueriaonosa" should read --auerigonosa--.

At column 10, line 23, "and R" should read --$R^5$--.

Signed and Sealed this

Eighteenth Day of May, 1999

Attest:

Q. TODD DICKINSON

Attesting Officer

Acting Commissioner of Patents and Trademarks